US012350696B2

(12) United States Patent
Forster et al.

(10) Patent No.: US 12,350,696 B2
(45) Date of Patent: Jul. 8, 2025

(54) ARRANGEMENT AND METHOD FOR THE PREFERABLY AUTOMATIC COATING OF OBJECTS

(71) Applicant: GEMA SWITZERLAND GMBH, St. Gallen (CH)

(72) Inventors: Axel Forster, Engelburg (CH); Felix Mauchle, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 7 days.

(21) Appl. No.: 18/365,873

(22) Filed: Aug. 4, 2023

(65) Prior Publication Data

US 2024/0042477 A1 Feb. 8, 2024

(30) Foreign Application Priority Data

Aug. 4, 2022 (DE) ..................... 10 2022 119 668.2

(51) Int. Cl.

*B05B 12/12* (2006.01)
*B05B 7/14* (2006.01)
*B05B 14/48* (2018.01)
*B05B 16/00* (2018.01)

(52) U.S. Cl.

CPC .............. *B05B 16/95* (2018.02); *B05B 7/144* (2013.01); *B05B 12/122* (2013.01); *B05B 14/48* (2018.02)

(58) Field of Classification Search

None

See application file for complete search history.

(56) References Cited

U.S. PATENT DOCUMENTS 5,122,192 A * 6/1992 Inukai ................... B05B 15/555 134/1
5,482,556 A * 1/1996 Shutic ..................... B05B 16/60 118/712
2003/0234272 A1 12/2003 Lamothe et al.

FOREIGN PATENT DOCUMENTS

CN 108940646 A 12/2018
DE 19546970 A1 6/1997
DE 20217416 U1 5/2003

(Continued)

OTHER PUBLICATIONS

Espacenet translation of DE102013007737.*
German Office Action dated Mar. 22, 2023, for corresponding German Application No. 10 2022 119 668.2.

*Primary Examiner* — Charles Capozzi
(74) *Attorney, Agent, or Firm* — Kinney & Lange, P.A.

(57) ABSTRACT

An arrangement is disclosed for the preferably automatic coating of objects with a coating material, in particular coating powder. The arrangement includes at least one spray device having a spray nozzle via which the coating material is dispensable in a main spraying direction. An extension is further provided, wherein an end region of the extension facing the spray device is preferably detachably connected to an end region of the spray device associated with the extension opposite from the spray nozzle. The arrangement further includes a preferably horizontally extending guide via which the extension with the spray device connected thereto can be longitudinally moved in the direction of extension of the guide relative to the object to be coated. The main spraying direction of the spray nozzle may be implemented so as to deviate from the direction of extension of the guide by a predefined or definable angle.

14 Claims, 3 Drawing Sheets

(56) References Cited

FOREIGN PATENT DOCUMENTS

| | | | |
|---|---|---|---|
| DE | 102013007737 | A1 | 11/2014 |
| DE | 102020109819 | A1 | 10/2021 |
| WO | 2021103154 | A1 | 6/2021 |

* cited by examiner

A-A

ARRANGEMENT AND METHOD FOR THE PREFERABLY AUTOMATIC COATING OF OBJECTS

CROSS-REFERENCE TO RELATED APPLICATION(S)

This application claims priority to German Application No. 102022119668.2 filed on Aug. 4, 2022, the entire contents of which are incorporated by reference herein.

BACKGROUND

The present disclosure relates in general to the coating of workpieces with coating material, particularly coating powder.

In particular, the present disclosure relates to the automatic coating of workpieces, particularly in a coating booth.

Coating booths for coating workpieces, in particular with coating powder, are known in general from the prior art. Such coating booths usually comprise a coating chamber with a booth floor, two oppositely positioned workpiece passageways as well as a conveyor device for transporting workpieces to be coated through the coating chamber. The conveyor device is usually arranged beneath the booth floor of the coating booth and has a workpiece carrier which extends into the coating chamber of the coating booth through a conveyance slot in the booth floor.

Coating booths having such "floor conveyors" are particularly used in the coating of high-quality workpieces since high coating quality can be achieved by arranging the conveyor device beneath the booth floor. This is particularly due to the potentiality of "traditional" conveyors for the suspended transport of workpieces through the coating chamber facilitating the falling of dirt particles or powder residues from the conveyor device, which can lead to irregularities in the coating.

A plurality of spray devices are usually used during the automatic coating of workpieces, these being able to be moved vertically up and down by means of a positioning device (particularly in the form of a lifting stand) which is normally arranged outside of the coating booth. The spray devices thereby extend from the positioning device through a vertical slot in the wall of the booth into a position in the booth opposite from the workpiece to be coated.

To not only coat a workpiece laterally but also apply coating material onto work-piece surfaces unable to be reached by lateral spray devices, providing further coating devices above and, if applicable, below the workpiece is known from the prior art. Reference is made in this regard to the system known from printed publication DE 10 2020 109 819 A1, for example.

The disadvantage of both vertically as well as horizontal arranged spray devices is in particular that the entire system has a relatively complex structure.

SUMMARY

The present disclosure is based on the task of specifying a solution with which a workpiece can be preferably automatically coated on all sides.

The present disclosure relates in particular to an arrangement for the preferably automatic coating of objects with a coating material, in particular coating powder, wherein the arrangement comprises at least one spray device having a spray nozzle via which the coating material is dispensable in a main spraying direction. The disclosed arrangement further exhibits an extension allotted to the at least one spray device, wherein an end region of the extension facing the spray device is preferably detachably connected to an end region of the spray device associated with the extension opposite from the spray nozzle.

A preferably horizontally extending guide is furthermore provided in the disclosed arrangement via which the extension with the spray device connected to the extension can be longitudinally moved in the guide's direction of extension relative to the object to be coated.

In particular provided according to the present disclosure is for the spray device with the spray nozzle to be implemented such that the main spraying direction of the spray nozzle deviates from the direction of the guide's extension by a predefined or definable angle.

In other words, the spray device of the disclosed arrangement is implemented so as to not spray coating material horizontally or vertically but rather at an oblique angle from above or below or vertically onto the object to be coated. This inclination to the main spraying direction enables the spray device to reach a considerably larger area, particularly angular or corner regions of workpieces.

Spray devices in the sense of the present application can be spray heads or guns. The spray nozzle can also be implemented as a rotating body. For example, a spray device having a rotating body for atomizing coating powder is known from printed publication U.S. Pat. No. 5,353,995. Rotating bodies for atomizing liquid coating material are furthermore known from the prior art.

Feasible spray nozzles are in particular spray nozzles having different spray patterns such as, for example, full cone, hollow cone, flat fan or full jet nozzles or multi-spray nozzles. Understood as the "main spraying direction" of the spray nozzle is thereby the centerline of the spray nozzle. The same also applies in a wider sense to spray nozzles having a rotating body for atomizing coating powder or for atomizing liquid coating material.

According to one further development of the disclosed arrangement, it is provided for the spray device to comprise a main body extending substantially in the direction of extension of the guide and having a first and an oppositely disposed second end region, whereby a high-voltage cascade circuit is or can be accommodated in the main body of the spray device which serves in electro-statically charging the coating materials dispensed or dispensable by the spray device.

Particularly able to be provided in this context is for the first end region of the main body of the spray device to be, in particular detachably, connected or connectable to an oppositely disposed end region of the spray device's associated extension. On the other hand, the second end region of the main body should be preferably detachably connected to the spray nozzle of the spray device, in particularly via an angled region. The angled region between the main body of the spray device and the spray nozzle of the spray device thereby dictates the predefined or definable angle by which the main spraying direction of the spray nozzle deviates from the direction of extension of the guide.

Particularly preferential in this context is for another extension piece to be provided between the angled region and the main body of the spray device so as to be able to individually set the plane in which the spray nozzle ultimately lies.

The extension allotted to the at least one spray device is preferably realized as a hollow body extending in the direction of extension of the guide in which preferably all of the supply lines necessary for the operation of the spray device are or can be accommodated. This thereby in particular relates to coating material supply lines, potentially provided electrical lines for supplying the electrostatic charge and/or air lines for shaping air.

As preferably all the supply lines necessary for the spray device's operation are in particular accommodated in encapsulated manner in the extension, contamination of the supply lines is effectively prevented during the operation of the arrangement, which substantially simplifies changing colors since there is only a small number of components that need to be cleaned (here only the outer surface of the extension).

Proven particularly preferential in practical use—given a horizontal extension of the guide—is for the main spraying direction of the spray nozzles to deviate by 15° to 75°, preferably by 25° to 65° and even more preferentially by approximately 40° to 50° from the guide's direction of extension, and preferably in a vertical direction.

This angular adjustment of the spray nozzles enables effective coating of a workpiece to be realized not only from the side (when the guide extends horizontally) but at the same time also from above and/or below.

Preferential implementations furthermore provide for a drive, particularly a linear drive, which is operatively connected to the extension such that the drive can effect a longitudinal movement of the extension with connected spray device in the direction of the guide's extension relative to said guide and relative to the object to be coated.

In other words, according to this further development, the at least one spray device can be moved and/or positioned in the longitudinal direction of the guide relative to the object to be coated.

Provided according to a further development of the latter cited embodiment is for the drive to be assigned a guide carriage which is guided on the guide and longitudinally moveable in the guide's direction of extension to which the extension is operatively connected such that when the drive effects a longitudinal displacement of the guide carriage relative to the guide, the extension correspondingly moves with it.

However, other embodiments for a suitable motor drive are of course also conceivable.

Proven particularly preferential is for the guide to comprise at least one roller guide connected to the guide, via which the extension with the spray device connected thereto is guided in longitudinally movable manner in the guide's direction of extension relative to the guide and relative to the object to be coated.

Instead of a roller guide, however, a sliding guide or other such similar guide is in principle also conceivable.

Particularly preferentially provided is for the arrangement to further comprise a lifting stand or axis system operatively connected to the guide such that the guide can be preferably vertically moved and positioned.

According to preferential embodiments of the disclosed arrangement, same not only comprises one spray device but rather a plurality of spray devices. For example, it is conceivable in this context for the arrangement to comprise a first spray device having a first spray nozzle and at least one further second spray device having a second spray nozzle, whereby the first extension associated with the first spray device and the second extension associated with the second spray device run parallel to each other and preferably at a vertical spacing from one another, wherein the guide further comprises at least one first roller guide connected thereto via which the first extension with the first spray device connected to said first extension is movably guided longitudinally relative to the guide and relative to the object to be coated in the guide's direction of extension. The guide has at least one second roller guide connected thereto via which the second extension with the second spray device connected to said second extension is movably guided longitudinally relative to the guide and relative to the object to be coated in the guide's direction of extension.

According to a further development of this embodiment, it is provided for the first extension and the second extension associated with the at least one further second spray device to each be operatively connected to the guide carriage such that when the drive effects a longitudinal displacement of the guide carriage relative to the guide, both the first extension as well as the second extension are correspondingly moved with it.

In the embodiment of the present disclosure employing a plurality of spray devices, it makes particular sense for the extension piece of the first spray device and the extension piece of the second spray device to be implemented such that the spray nozzle of the first spray device and the spray nozzle of the second spray device lie in a common, preferably horizontal, plane.

Alternatively or additionally thereto, it is preferential for the angled region of the first spray device and the angled region of the at least one further second spray device to be realized such that the main spraying direction of the spray nozzle of the first spray device runs parallel or at least substantially parallel to the main spraying direction of the spray nozzle of the at least one further second spray device.

An alternative arrangement of the spray devices is further conceivable where they are not disposed vertically one below the other but rather horizontally adjacent. Thus, in particular also possible is a combined tandem arrangement (e.g. 2×2) of two horizontally adjacent spray devices and then two more horizontal spray devices vertically offset underneath.

Generally speaking, the arrangement can comprise a first spray device having a first spray nozzle and at least one further second spray device having a second spray nozzle, wherein the first extension associated with the first spray device and the second extension associated with the at least one second spray device run parallel to each other and are vertically spaced from one another and/or run parallel to each other and are horizontally spaced from one another.

The present disclosure further relates to a system for the preferably automatic coating of workpieces with coating material, in particular coating powder, wherein the system comprises a spray coating booth which preferably has a conveyor device for the in particular continuous transporting of objects to be coated through the coating booth. The system according to the present disclosure further comprises a lifting stand or axis system, particularly a vertically adjustable lifting stand or axis system. The disclosed system moreover comprises an arrangement in accordance with the above-described disclosed type.

Particularly provided is for the arrangement and in particular the guide of the arrangement to be operatively connected to the lifting stand or axis system such that the guide with the at least one spray device supported so as to be longitudinally displaceable in the guide's direction of extension along with the guide is movable and positionable in a direction orthogonal to the guide's direction of extension.

According to a further aspect, the present disclosure further relates to a method for the preferably automatic coating of workpieces with coating material, in particular coating powder. In this, at least one arrangement of the above-described disclosed type is first provided. The at least one spray device of the arrangement is then subsequently moved relative to the workpiece to be coated, preferably by means of a lifting stand or axis system.

The disclosed coating method is in particular also characterized in that the at least one spray device of the arrangement is moved in a horizontally oscillating motion relative to the workpiece to be coated.

Alternatively or additionally thereto, the disclosed coating method is in particular characterized in that the method further comprises the following method steps:

- conveying the workpiece to be coated along a transport path through a coating area of a coating station via a conveyor device, and preferably doing so at a constant conveying speed; and
- detecting a size, geometry and/or contour of at least one region of the workpiece to be coated in a monitored area situated on the transport path of the object to be coated and upstream—seen in the conveyance direction of the conveyor—of the coating area.

It is conceivable in this context for the at least one spray device of the arrangement to be horizontally and/or vertically positioned and/or aligned in the direction of conveyance with regard to the coating area via a positioning device in the coating station, in particular after a delay and preferably after a delay contingent on the conveying speed and the distance between the monitored area and the coating area, such that when the workpiece to be coated is conveyed through the coating area, the at least one spray device of the arrangement is then always at a predefined or definable distance from and/or a predefined or definable alignment to the surface of the workpiece to be coated.

It is conceivable in this context for the size, geometry and/or contour of the at least one region of the workpiece to be coated to be detected via an at least partial scanning of the workpiece by means of at least one first laser beam running perpendicular to the conveyance direction of the conveyor device and by means of at least one second laser beam running obliquely to the conveyance direction of the conveyor device.

The intended use of the disclosed arrangement can in particular be seen in the following applications:

- spraying structural elements from top to bottom or from bottom to top, whereby the spray devices make a horizontal oscillating movement; and/or
- positioning the spray devices at a specific position, wherein said position is maintained during spraying, whereby different spray angles are conceivable in this usage, thus also 0°; and/or
- positioning the spray devices at a specific position, wherein said position can be adjusted during spraying in correspondence with the structural element (e.g. long supports somewhat inclined on the conveyor), whereby different spray angles are conceivable in this usage, thus also 0°; and/or
- dipping the spray devices into recesses, hollow spaces or cavities, whereby different spray angles are conceivable in this usage, thus also 0°.

BRIEF DESCRIPTION OF THE DRAWINGS

The following will reference the accompanying drawings in describing an exemplary embodiment of the disclosed arrangement in greater detail.

Shown are.

DETAILED DESCRIPTION

Figure 1:
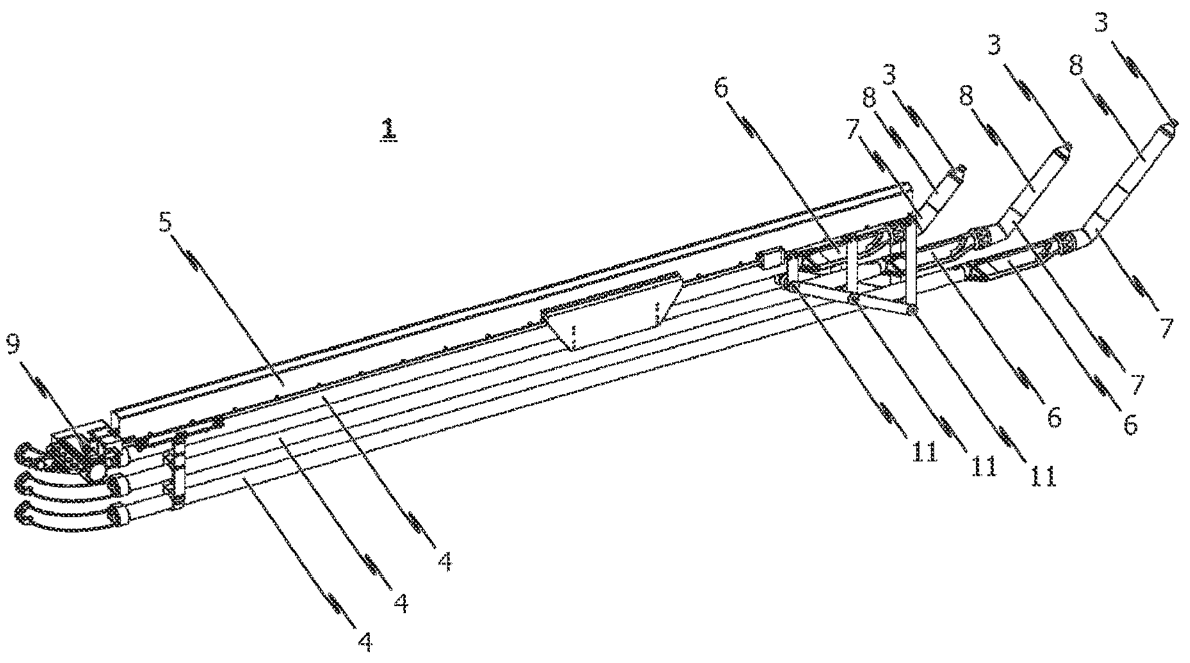
FIG. 1: a schematic and isometric view of an exemplary embodiment of the arrangement according to the present disclosure for the automatic coating of objects with coating powder.

In addition to vertically oscillating axis systems fitted with coating guns, so-called horizontal gun axes or infeed axes are also normally used in the automatic coating of complex structural elements/objects, these likewise being fitted with suitable coating guns. The guns on the infeed axes are individually positioned according to the geometry of the parts to be coated so as to thereby be able to spray the varying depths of the parts of the object to be coated at the correct distance.

Reference is in this context made to the system known from printed publication DE 10 2020 134 087 A1, for example.

For example, in most coating systems, spray devices/coating guns spray a structural element hanging on the conveyor serving as a conveyor device from the left and from the right. The spray devices or coating guns thereby oscillate in a vertical plane next to the workpiece to be coated.

In many cases this is sufficient since the coating material also reaches those parts of the structural element which are not directly situated in front of the spray device or coating gun.

However, there is a limitation here and, particularly in the case of complex workpiece geometries, manual re-coating consequently follows.

In some cases, horizontally oscillating coating devices or coating guns are also required. Meaning guns or spray devices oscillating e.g. below the workpiece and spraying upwards orthogonal to the conveyance direction of the workpiece to be coated. This requires utilizing the X-axes, on which the vertical axes stand, for this new horizontal oscillating movement.

Disadvantageous in this regard is the large mass thereby needing to be moved as a result and the thereby resultant instability. In addition, X-axes of corresponding axis systems are usually not designed for this constant movement and take up a relatively large amount of space.

The disclosed arrangement can effectively prevent these problems, as will be described below in greater detail with reference to the accompanying drawings based on an exemplary embodiment.

In detail, the exemplary embodiment of the disclosed arrangement 1 for the automatic coating of objects with coating powder shown in the drawings comprises a plurality of spray devices 2 (here: three), each with a respective spray nozzle 3 via which the coating material can be dispensed in a main spraying direction.

Each spray device 2 furthermore exhibits a respectively associated extension 4, wherein an end region of the extension 4 facing the spray device 2 is preferably detachably connected to an end region of the spray device 2 associated with the extension 4 opposite from the spray nozzle 3.

The disclosed arrangement 1 is in particularly characterized in that it further comprises a preferably horizontally extending guide 5 via which the respective extensions 4 with the spray devices 2 connected to said extensions 4 can be longitudinally moved in the direction of extension of the guide 5 relative to the object to be coated.

Figure 2:
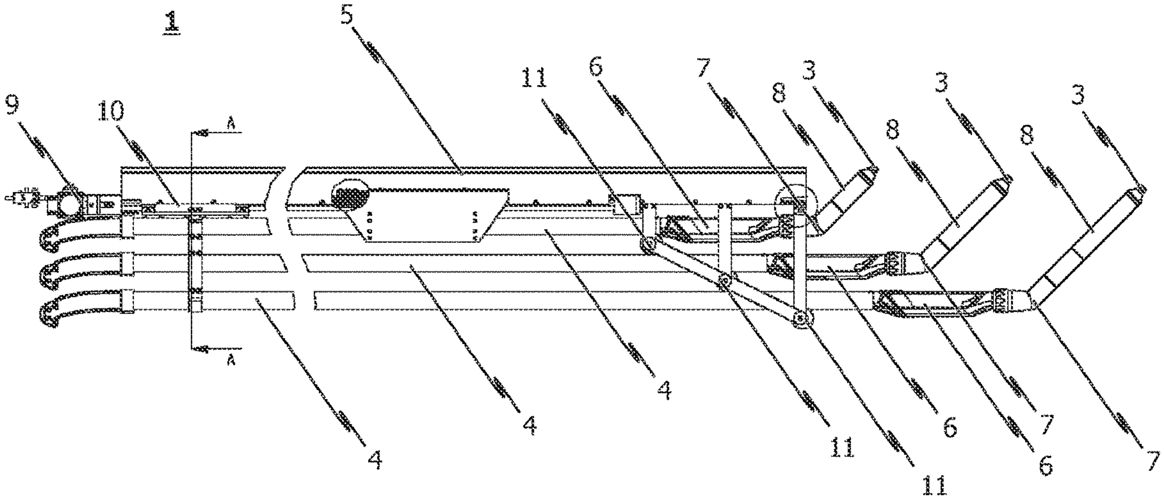
FIG. 2: a schematic and side view of the arrangement according to FIG. 1.

As can be seen particularly from the FIG. 2 illustration, the disclosed solution in particular provides for the spray devices 2 with the spray nozzles 3 to be implemented such that the main spraying direction of the spray nozzles 3 deviates by a predefined or definable angle from the direction of extension of the guide 5.

In the embodiment shown in the drawings, the guide 5 extends horizontally, whereby the main spraying direction of the spray nozzles 3 deviates approximately 40° to 50° from the direction of extension of the guide 5, and does so in a vertical direction. Of course, however, other angled regions are also possible.

To be noted in particular from the FIG. 2 side view is that each of the total three spray devices 2 comprises a main body 6 extending substantially in the direction of extension of the guide 5 and having a first and an oppositely disposed second end region. A high-voltage cascade circuit is or can be accommodated in the main body 6 of each spray device 2 which serves in electrostatically charging the coating material dispensed or dispensable by the respective spray device 2.

The first end region of the main body 6 of each spray device 2 is, in particular detachably, connected to an oppositely disposed end region of the extension 4 associated with the spray device 2. On the other hand, the second end region of the main body 6 of each spray device 2 is preferably detachably connected to the spray nozzle 3 of the spray device 2 via a corresponding angled region 7.

Further able to be noted from the side view according to FIG. 2 is that another extension piece 8 is provided between the angled region 7 and the main body 6 of each spray device 2.

Figure 4:
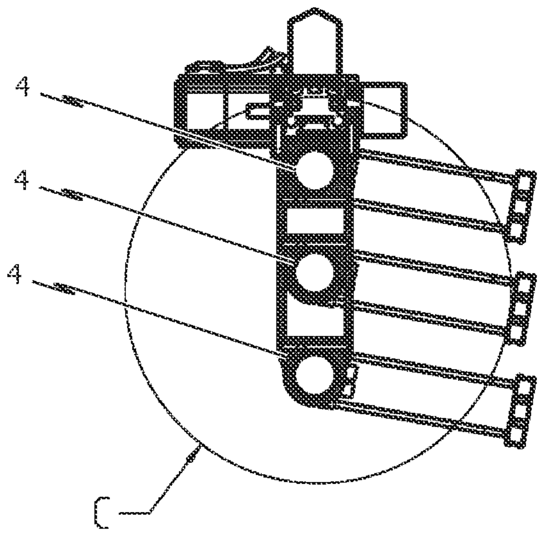
FIG. 4: a schematic cross-sectional view along the A-A line in FIG. 2.
Figure 5:
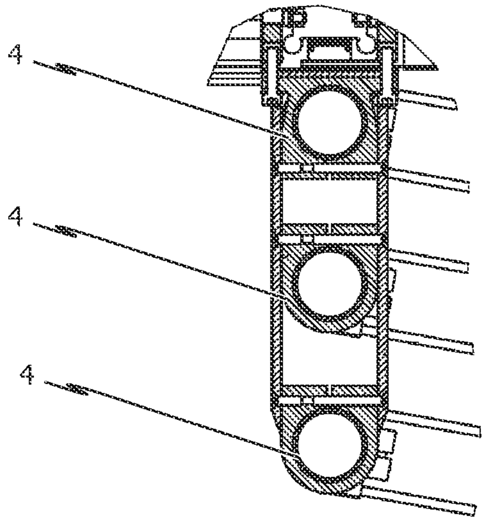
FIG. 5: a schematic enlargement of the cross-sectional view according to FIG. 4.

It can be seen from the cross-sectional view in FIG. 4 and FIG. 5 that each extension 4 of the respective spray devices 2 is realized as a hollow body extending in the direction of extension of the guide 5. Preferably all of the supply lines necessary for the operation of the respective spray device 2 are accommodated in this hollow body.

Figure 3:
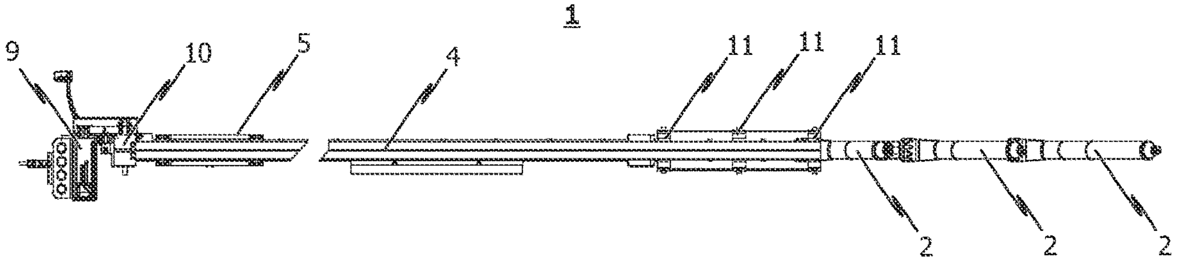
FIG. 3: a schematic and top view of the exemplary embodiment of the disclosed arrangement according to FIG. 1.

To be seen in particular in FIG. 1 to FIG. 3 is that the disclosed arrangement 1 further comprises a drive 9, particularly an electromotive linear drive, which is operatively connected to the respective extensions 4 of the spray devices 2 such that the drive 9 can effect a longitudinal movement of the extensions 4 with the spray devices 2 connected to said extensions 4 in the direction of extension of the guide 5 relative to said guide 5 and relative to an object to be coated.

The drive 9 is assigned a guide carriage 10 which is guided on the guide 5 and longitudinally movable in the direction of extension of the guide 5 to which the extension 4 is operatively connected such that when the drive 9 effects a longitudinal displacement of the guide carriage 10 relative to the guide 5, the extensions 4 correspondingly move with it.

Further provided in the embodiment of the disclosed arrangement 1 shown in the drawings is for the guide 5 for each extension 4 to comprise a roller guide 11 connected to the guide 5 via which the respective extension 4 with the spray device 2 connected to said extension 4 is guided in longitudinally movable manner in the direction of extension of the guide 5 relative to the guide 5 and relative to the object to be coated.

Although not depicted in the drawings, it is conceivable for the disclosed arrangement 1 to be used in conjunction with a lifting stand or axis system which is operatively connected to the guide 5 of the arrangement 1 such that the guide 5 can be preferably vertically moved and positioned by means of said lifting stand or axis system.

To be noted particularly from the FIG. 2 side view is that the respective extension pieces of the spray devices 2 are selected such that the spray nozzles 3 of the spray devices 2 lie in a common, preferably horizontal, plane.

On the other hand, the angled regions of the spray devices 2 are selected such that the main spraying direction of the individual spray nozzles 3 run parallel or at least substantially parallel to each other.

The present disclosure is not limited to the exemplary embodiment depicted in the drawings but rather yields from an integrated overall consideration of all the features as disclosed herein.

LIST OF REFERENCE NUMERALS

1 arrangement
2 spray device
3 spray nozzle
4 extension
5 guide
6 main body of spray device
7 angled region
8 extension piece
9 drive
10 guide carriage
11 roller guide

The invention claimed is:

1. An arrangement for coating of objects with a coating material, wherein the arrangement comprises:

a first spray device having a first spray nozzle via which coating material is dispensable in a main spraying direction, and at least one further second spray device having a second spray nozzle via which coating material is dispensable in a main spraying direction;

a first extension associated with the first spray device and a second extension associated with the at least one further second spray device, wherein the first extension and the second extension run parallel to each other and are vertically spaced from one another and/or run parallel to each other and are horizontally spaced from one another, wherein an end region of the first extension facing the first spray device is connected to an end region of the first spray device opposite from the first spray nozzle, and wherein an end region of the second extension facing the at least one further second spray device is connected to an end region of the at least one further second spray device opposite from the second spray nozzle; and a guide via which the first extension with the first spray device connected thereto and the second extension with the at least one further second spray device connected thereto can be longitudinally moved in a direction of extension of the guide relative to the object to be coated, wherein the first spray device comprises a main body extending substantially in the direction of extension of the guide and having a first and an oppositely disposed second end region, whereby a cascade circuit is accommodated in the main body of the first spray device which serves in electrostatically charging the coating material dispensed or dispensable by the first spray device, wherein the first end region of the main body of the first spray device is detachably connected or connectable to an oppositely disposed end region of the first extension associated with the first spray device, and wherein the second end region of the main body of the first spray device is detachably connected to the first spray nozzle via a first angled region;

wherein the at least one further second spray device comprises a main body extending substantially in the direction of extension of the guide and having a first and an oppositely disposed second end region, whereby a cascade circuit is accommodated in the main body of the at least one further second spray device which serves in electrostatically charging the coating material dispensed or dispensable by the at least one further second spray device, wherein the first end region of the main body of the at least one further second spray device is detachably connected or connectable to an oppositely disposed end region of the second extension associated with the at least one further second spray device, and wherein the second end region of the main body of the at least one further second spray device is detachably connected to the second spray nozzle via a second angled region;

wherein the first spray device with the first spray nozzle is implemented such that the main spraying direction of the first spray nozzle deviates from the direction of extension of the guide by a predefined or definable angle, and wherein the at least one further second spray device with the second spray nozzle is implemented such that the main spraying direction of the at least one further second spray nozzle deviates from the direction of extension of the guide by a predefined or definable angle;

wherein a first extension piece is provided between the first angled region and the main body of the first spray device, and wherein a second extension piece is provided between the second angled region and the main body of the at least one further second spray device; and wherein the first extension piece associated with the first spray device and the second extension piece associated with the at least one further second spray device are implemented such that the first spray nozzle of the first spray device and the second spray nozzle of the at least one further second spray device lie in a common horizontal plane.

2. The arrangement according to claim 1, wherein the extension is realized as a hollow body extending in the direction of extension of the guide in which supply lines necessary for the operation of the first spray device and of the at least one further second spray device are accommodated.

3. The arrangement according to claim 1, wherein the guide extends in a horizontal direction, and wherein the main spraying direction of the first spray nozzle and the main spraying direction of the at least one further second spray nozzle deviate by 15° to 75° from the direction of extension of the guide.

4. The arrangement according to claim 1, wherein a drive is further provided which is operatively connected to the first extension associated with the first spray device and to the second extension associated with the at least one further second spray device such that the drive can effect a longitudinal movement of the first extension with the first spray device connected to the first extension and a longitudinal movement of the second extension with the at least one further second spray device connected to the second extension in the direction of extension of the guide relative to said guide and relative to the object to be coated.

5. The arrangement according to claim 4, wherein the drive is assigned a guide carriage which is guided on the guide and longitudinally moveable in the direction of extension of the guide to which the first extension and the second extension are operatively connected, such that when the drive effects a longitudinal displacement of the guide carriage relative to the guide, the first extension and the second extension correspondingly move with it.

6. The arrangement according to claim 1, wherein the guide comprises at least one roller guide connected to the guide, via which the first extension with the first spray device connected to the first extension and the second extension with the at least one further second spray device connected to the second extension are guided in a longitudinally movable manner in the direction of extension of the guide relative to the guide and relative to the object to be coated.

7. The arrangement according to claim 1, wherein a lifting stand or axis system is operatively connected to the guide such that the guide is movable and positionable vertically.

8. The arrangement according to claim 1, wherein the guide further comprises at least one first roller guide via which the first extension with the first spray device connected to said first extension is movably guided longitudinally relative to the guide and relative to the object to be coated in the direction of extension of the guide, and wherein the guide further comprises at least one second roller guide via which the second extension with the at least one further second spray device connected to said second extension is movably guided longitudinally relative to the guide and relative to the object to be coated in the direction of extension of the guide.

9. A system for coating of workpieces with coating material, wherein the system comprises:

a spray coating booth with a conveyor device for continuous transporting of objects to be coated through the spray coating booth;

a lifting stand or axis system; and at least one arrangement according to claim 1, wherein the at least one arrangement and the guide of the at least one arrangement are operatively connected to the lifting stand or axis system such that the guide with the at least one spray device supported so as to be longitudinally displaceable in the direction of extension of the guide along with the guide is movable and positionable in a direction orthogonal to the direction of extension of the guide.

10. A method for coating of a workpiece with coating material, wherein the method comprises:

providing at least one arrangement according to claim 1; and moving the first spray device and the at least one further second spray device of the at least one arrangement relative to the workpiece to be coated by means of a lifting stand or axis system, wherein the first spray device and the at least one further second spray device of the at least one arrangement is moved in a horizontally oscillating motion relative to the workpiece to be coated.

11. The method according to claim 10, further comprising:

conveying the workpiece to be coated along a transport path through a coating area of a coating station via a conveyor device; and detecting a size, geometry and/or contour of at least one region of the workpiece to be coated in a monitored area situated on the transport path of the workpiece to be coated and upstream of the coating area in a conveyance direction of the conveyor;

wherein the first spray device and the at least one further second spray device of the at least one arrangement are horizontally and/or vertically positioned and/or aligned in the conveyance direction with regard to the coating area via a positioning device in the coating station, after a delay contingent on a conveying speed and a distance between the monitored area and the coating area, such that when the workpiece to be coated is conveyed through the coating area, the first spray device and the at least one further second spray device of the arrangement are always at a predefined or definable distance from and/or a predefined or definable alignment to the surface of the workpiece to be coated.

12. The method according to claim 11, wherein the size, geometry and/or contour of the at least one region of the workpiece to be coated is/are detected via an at least partial scanning of the workpiece by means of at least one first laser beam running perpendicular to the conveyance direction of the conveyor device and by means of at least one second laser beam running obliquely to the conveyance direction of the conveyor device.

13. The arrangement according to claim 1, wherein the guide extends in a horizontal direction, and wherein the main spraying direction of the first spray nozzle and the main spraying direction of the at least one further second spray nozzle deviate by 25° to 65° from the direction of extension of the guide.

14. The arrangement according to claim 1, wherein the guide extends in a horizontal direction, and wherein the main spraying direction of the first spray nozzle and the main spraying direction of the at least one further second spray nozzle deviate by 40° to 50° from the direction of extension of the guide.

* * * * *